United States Patent [19]

Topper et al.

[11] Patent Number: 5,157,497
[45] Date of Patent: Oct. 20, 1992

[54] METHOD AND APPARATUS FOR DETECTING AND COMPENSATING FOR WHITE SHADING ERRORS IN A DIGITIZED VIDEO SIGNAL

[75] Inventors: Robert J. Topper, Hatboro, Pa.; Lee R. Dischert, Medford, N.J.

[73] Assignee: Matsushita Electric Industrial Co., Ltd., Osaka, Japan

[21] Appl. No.: 660,698

[22] Filed: Feb. 25, 1991

[51] Int. Cl.$^5$ .............................................. H04N 5/30
[52] U.S. Cl. .................. 358/209; 358/163; 358/168
[58] Field of Search ............... 358/163, 168, 169, 166, 358/28, 37, 209, 213.15, 10; 382/52, 53, 50, 51

[56] References Cited

U.S. PATENT DOCUMENTS

| | | | |
|---|---|---|---|
| 4,285,004 | 8/1981 | Morrison | 358/10 |
| 4,312,014 | 1/1982 | Ryan | 358/41 |
| 4,326,219 | 4/1982 | Griesshaber | 358/163 |
| 4,354,243 | 10/1982 | Ryan et al. | 364/515 |
| 4,486,781 | 12/1984 | Wilmer et al. | 358/163 |
| 4,633,314 | 12/1986 | Kurata et al. | 358/163 |
| 4,695,884 | 9/1987 | Anastassiou et al. | 358/163 |
| 4,731,652 | 3/1988 | Yamanaka | 358/163 |
| 4,945,405 | 7/1990 | Hirota | 358/75 |
| 4,962,425 | 10/1990 | Rea | 358/139 |
| 5,001,768 | 3/1991 | Mita et al. | 382/50 |
| 5,047,861 | 9/1991 | Houchin et al. | 358/213.15 |

*Primary Examiner*—Michael Razavi
*Assistant Examiner*—Tuan U. Ho
*Attorney, Agent, or Firm*—Amster, Rothstein & Ebenstein

[57] ABSTRACT

A white shading correction system capable of automatic determination of the amount of white shading correction to be applied to specific video image pixels as well as the application of that correction to a digitized video signal is disclosed. This system includes an inspecting portion for identifying the required correction within a video frame, a calculating portion for computing the amount of correction to be applied to the video signal, and a correction portion for correcting the video signal based upon the correction computed by the calculating portion.

6 Claims, 3 Drawing Sheets

Line 1
Line 2
.
.
.
Line n

Amp (n,m)
(video image)

Col 1  Col 2 . . . . . . . . . . Col m

FIG. 3

METHOD AND APPARATUS FOR DETECTING AND COMPENSATING FOR WHITE SHADING ERRORS IN A DIGITIZED VIDEO SIGNAL

BACKGROUND OF THE INVENTION

1. Field of Invention

This invention relates to a method and apparatus for automatic white shading correction of video signals with the correction derived from using a flat white calibration target.

2. Description of Related Art

In scanned detector systems such as television (video) cameras, problems arise when viewing a perfectly white, featureless, calibration target. Video signals resulting from viewing a perfectly white calibration target with a current technology raster scan camera do not correspond to a "flat white" video signal at the output, but instead contain various amounts of undesired distortions or shading. Different factors cause these distortions, among them the inherent non-uniformity in the sensitivity of the video camera's photo electric devices and its optical system imperfections. The undesired shading can be considered as a "calibration" error in the analog output video signal that results in inaccurate reproduction of video signal amplitudes in other scenes to be imaged with the same video camera. White shading adjustment corrects such inherent "calibration" errors. Historically such errors were compensated for by manipulating the gain of the video amplifier on a line-by-line or pixel-by-pixel basis.

As an example, in video cameras, various adjustable analog signals such as sawtooths and parabolas applied in both horizontal and vertical directions can be used to modulate the output video signals in an attempt to correct the analog video signal while calibrating the camera against a flat white calibration target. Typically, such white shading correction is performed manually by viewing the video output waveform from the camera on a monitor and then manually introducing varying amounts of horizontal and vertical corrections to minimize or eliminate the white shading distortions. The manually varied sawtooth or parabola waveforms are used to compensate the video signal from the camera to produce a less distorted output more closely resembling the imaged flat white calibration target. Inherent in these prior art systems is the requirement that an operator monitor the video waveform while a calibration target is being imaged and then manually input the corrections to correct for white shading distortions.

However, this analog waveform method of white shading correction does not conveniently allow for the introduction of higher order corrective waveforms for two reasons. First, the information necessary to properly determine these higher order waveforms cannot be efficiently derived from visual inspection. Second, even if such higher order corrective analog waveforms would be provided, it is difficult to manually set them to yield optimal corrections.

Another limitation, in the prior art is that only a limited number of correction points are available as compared to the total number of pixels (image elements or data) in an image, therefore the corrections that can be derived from this limited number of points is by necessity incapable of correcting for errors detailed to the level of individual pixels. Furthermore, typically the waveform needed to perform the correction function is available separately from where it needs to be applied. This lack of coordination between the identification of the corrective waveform, and its application at the pixel level limits the usefulness of the prior art systems.

In view of the limitations of the prior art, it is an object of the present invention to provide a method and apparatus which enables automatic white shading correction of a video signal where the determination of the corrective waveform as well as its application to the signal to be corrected is achieved within the same apparatus.

It is another object of the invention to provide a method and apparatus for detecting a signal needing white shading correction and, as a result of this detection, performing the required white shading correction.

It is still another object of the invention to provide a method and apparatus for detecting a signal needing white shading correction by evaluating each pixel of a video signal and calculating white level correction coefficients for each pixel to be used subsequently during the acquisition of other video images.

It is yet another object of the invention to provide a method and apparatus for reducing the influence of noise during the determination of a white shading correction.

SUMMARY OF THE INVENTION

The present invention relates to a white shading correction system used in compensating for white shading errors in a digitized video signal. The video signal represents a sequence of horizontally scanned video images having a plurality of pixels organized in horizontal lines. Each of the pixels or data elements within this digitized video signal are characterized by a digital value denoting their amplitude. The white shading correction system operating on such a digitized video signal is made up of these three major subsystems:

1) an inspecting portion for inspecting the amplitude of the output of the pixels which are part of the video image when the image is that of a flat white calibration target;

2) a calculator portion for calculating for each pixel inspected by the inspecting portion a white shading correction coefficient ; and 3) a correction portion for correcting pixels in subsequent video images based on the white shading correction coefficients calculated by the calculator portion.

The inspection portion and the calculator portion function together to calculate the needed white shading correction. To do this, consider the structure of a typical video image. A horizontally scanned video image is made up of a plurality of horizontal lines, each horizontal line comprising multiple pixel amplitudes, i.e. data. Multiple horizontal lines, when aligned on a video screen, will form a video image made up of the individual pixels present on each line. If the video camera generating the video image to be analyzed is pointed to a flat white calibration target, the pixels will form the image of the calibration target. It is the video rendition of this calibration target that is analyzed by the inspection and calculator portion to derive the needed white shading correction given the presumption that the rendition of the image is not error free and therefore requires correction.

The presently preferred embodiment of the invention will now be described.

The first major block in the inspection and calculator portion is a first accumulator. This block sums pixel amplitudes (data) present in each of the horizontal lines of the video image associated with the flat white target. The output of this accumulator is the sum of the amplitudes of the pixels for each of the horizontal video lines.

The second major block is another, second accumulator for inspecting a plurality of horizontal line data, or pixels. This second accumulator performs two functions. First, it examines the horizontal lines making up the whole video image showing the flat white calibration target and compiles from the horizontal line data a derived quantity: vertical column data. Second, after having extracted the individual data columns from the horizontal video data, this second accumulator sums the value of the amplitudes of the pixels (data) making up a vertical column, for each column found in the video image, and outputs the result.

The vertical column data consists of the pixel amplitudes in the same position in each of the horizontal lines. The vertical columns are generated from the horizontal lines by reading the pixel amplitude at a certain position in each line for all lines. Another way of analyzing the derivation of the vertical column data is to look at it in a mathematical sense. The vertical data can be obtained by defining the flat white video image as a matrix of amplitudes, $A(n,m)$, where n is the index of rows (or image lines) and m is the index of columns (or pixel positions within a line). Here, the amplitude of pixel #1 in horizontal line 1 is matrix element $A(1,1)$, pixel #1 in horizontal line 2 is $A(2,1)$, and pixel #1 in horizontal line 3 is $A(3,1)$ and so on. Each of the vertical columns formed by pixels of the image make up the vertical column data.

The third block of the inspection and calculator portion of this system is a processing apparatus for calculating the correction coefficients from the summed values output from the output of the first accumulator and the output of the second accumulator. This function is typically achieved with a microprocessor that stores the values output by the first and second accumulators for each line and column and computes the white shading correction coefficients to be applied to subsequent video images. The processor writes the corrections into a horizontal and a vertical correction memory, part of the correction portion, discussed below.

Returning to the overall structure, the third major part of the preferred embodiment of this invention is the correction portion. Here, the correction coefficients generated by the inspection and calculator portion while the calibration target is imaged are read out and combined into a digital multiplier in synchronism with the pixel values making up the stream of digitized video frames that constitutes the video signal. This correction portion multiplies the amplitude of each pixel of each video frame of the incoming video signal with the stored correction coefficients. The product of the incoming pixel times the correction coefficient represents a corrected video pixel amplitude where the white shading errors are compensated for all video images subsequent to the image of the flat white calibration target.

The memory means for storing white shading corrections is made up of three major parts. The first part is a horizontal correction memory for storing correction coefficients generated from the vertical column data. This vertical column data was generated by the second accumulator in the inspection and calculator subsystem. The second part is the vertical correction memory for storing correction coefficients generated from the horizontal data summing accumulator.

The third major part associated with the memory means is a combining circuit for combining and timing the read out of data stored in the two correction memories. This combining circuit allows the data from the horizontal correction memory and vertical correction memory to be read out for each pixel in sequence. A combining circuit for combining the vertical correction coefficient and the horizontal correction coefficient corresponding to a particular pixel of the video signal is provided. This combining circuit outputs a pixel correction coefficient to the multiplier for each pixel.

Many such corrections sets can be stored in the microprocessor memory of the inspection and calculator portion for readout into the horizontal and vertical correction memories depending on the current operating condition of the video camera generating the image. For example, different white shading corrections can be stored for compensating for white shading errors in a digitized video signal for different camera conditions including iris setting and zoom position.

In general, the method for detecting and compensating for white shading errors in a digitized video signal representing a horizontally scanned video image having a plurality of pixels, comprises the steps of:

1) inspecting the amplitude of the pixels making up the video image of a flat white calibration target;
2) calculating for each pixel in the image of the calibration target a white level correction coefficient; and
3) correcting the amplitude of pixels of subsequent images based upon the white level correction coefficients calculated in step 2.

The inspecting step comprises:
a) measuring the amplitude of the pixels making up each horizontal line;
b) summing pixel amplitudes for each horizontal line making up the video image of the calibration target;
c) inspecting a plurality of horizontal lines making up a whole video image, and compiling from these horizontal lines vertical column data derived from the horizontal lines;
d) summing thus obtained vertical data for each vertical column of vertical data;

The calculating step comprises:
a) calculating vertical correction coefficients from the summed values of the horizontal lines by;
  i) computing the average amplitude of each line;
  ii) finding the largest average for a line in the image; and
  iii) computing a multiplier factor for each line, that will bring the average of that line up to the largest line average in the image; and
b) calculating horizontal correction coefficients from the summed values of the vertical lines by:
  i) computing the average amplitude of each column of data in the image;
  ii) finding the largest average for a column of data in the image and
  iii) computing a multiplier factor for each column data that will bring the average of that column data up to the largest column average in the image.

The correction method also includes storing the correction coefficients in horizontal and vertical memories whose contents are read out in synchronism with the pixels of video images reproduced subsequently to the calibration image. These corrections multiply the pixel values of subsequent images thereby correcting them for white shading errors.

These together with other objects and advantages which will be subsequently apparent, reside in the details of construction and operation as more fully hereinafter described and claimed.

DESCRIPTION OF THE PREFERRED EMBODIMENT

Figure 1:
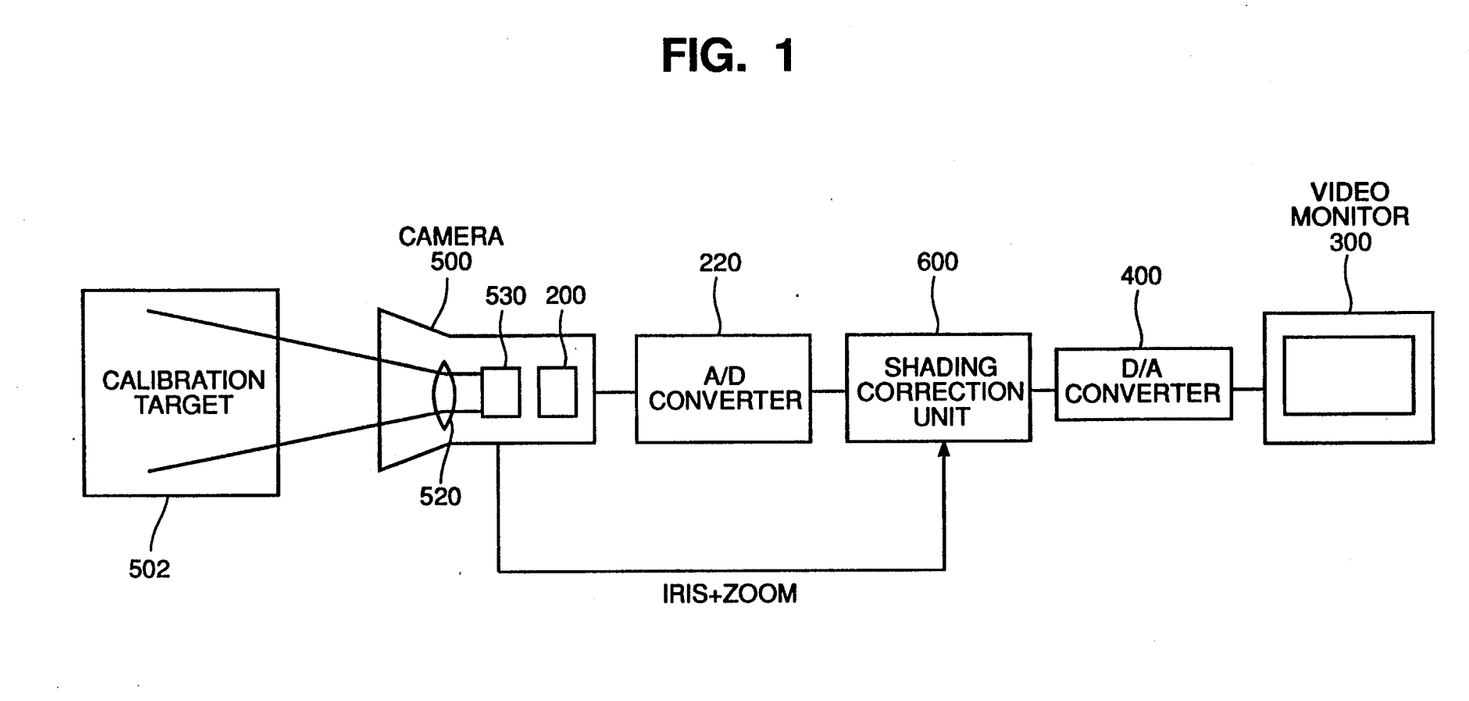
FIG. 1 shows the overall image acquisition and correction system.

FIG. 1 shows the overall video system where the present invention has utility. Here, a video camera 500 whose output is to be corrected for white shading errors is imaging a flat white calibration target 502. Camera 500 has a video tube or any pickup device and lens system 520. The image of the calibration target 502 is focussed on photo sensitive sensors 530 making up the photo sensitive part of the camera 500. Intensity information from sensors 530 is serialized in scanning electronics associated with sensors 530 and transmitted to video amplifier 200. Video amplifier 200 has a fixed gain. The output of amplifier 200 is converted to digital signals by analog to digital (A/D) converter 220. Shading correction unit 600 performs the white shading correction in the sequence of images produced by video camera 500 and associated video amplifier 200. The digital signal from correction unit 600 is converted back to an analog signal by digital to analog converter 400 and is viewed on video monitor 300. Iris and zoom status information is transmitted from camera 500 to correction unit 600.

Figure 2:
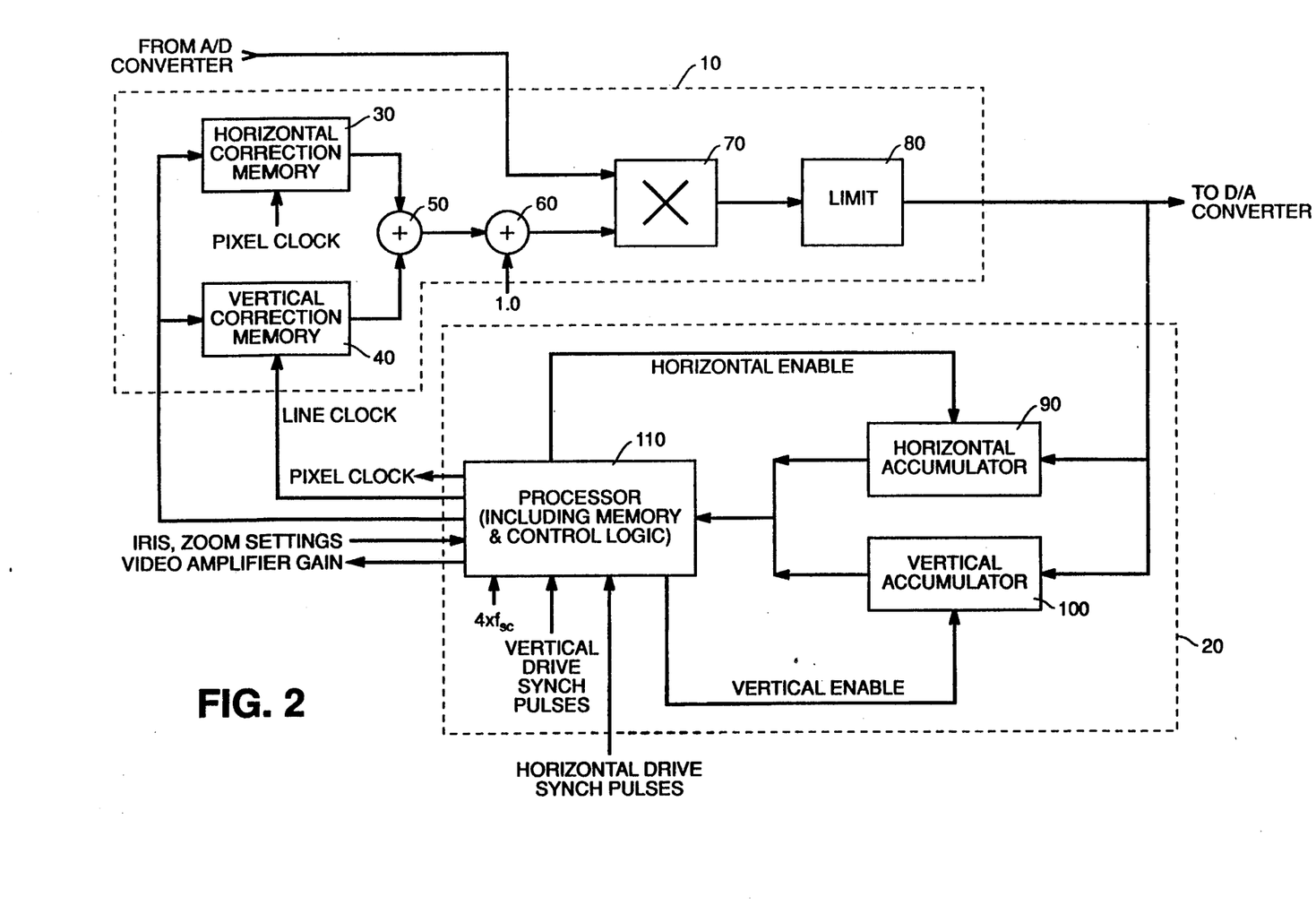
FIG. 2 is a block diagram of the major circuit blocks performing white shading correction according to the present invention.

FIG. 2 is a block diagram of the circuit for performing white shading correction 600 according to the present invention. In general, correction means 10 implements the required correction of the signal after inspection of the signal requiring white shading correction by inspecting means 20. Inspecting means 20 generates a table of line averages for each horizontal line and a table of column averages for each vertical column, and gain coefficients from the initially uncorrected video image of the calibration target.

The line average for each horizontal line is calculated in two steps:
 a) summing the magnitude value of the amplitude (or intensity) of each pixel in the line being examined and
 b) dividing that sum by the number of data elements (i.e. pixels) in the line.

The result is the line average for that line. The column average for each vertical column is calculated similarly, i.e. summing the intensities of the pixels present in a column of the image and dividing by the number of lines over which the vertical sum was made.

The procedure and its implementation is explained by the use of an example. In this example horizontal line averages are calculated first, subsequently the vertical column averages are calculated. Note that the vertical column averages can be calculated and corrected first without affecting overall results.

In the exemplary implementation, horizontal accumulator 90 receives the representative digital amplitude value for each pixel across a given line and sums these amplitude values over the entire line. Horizontal accumulator 90 can be made up of, for example, AM 29823A latches manufactured by Advanced Micro Devices working in conjunction with four 74 LS 283 four bit adders manufactured by Texas Instruments, complemented by proper "glue" logic (such as 74ALS573 buffers) and supplied with the necessary timing information to perform the summation function. The summing step is repeated for each horizontal line making up the image and the result of the summation for each line is stored by processor 110 in its memory.

Note that the summation results for the lines making up the digitized image need not be loaded into the memory associated with processor 110 during a single video frame, but can be spread out over a few video frames, as long as the same calibration target is being imaged. Because the time demand for processing is not stringent, processor 110 can be, for example, an 8031 microprocessor manufactured by INTEL.

The vertical accumulator 100 functions similarly. The table of vertical pixel sums is calculated and stored by using vertical accumulator 100. Vertical accumulator 100 can comprise, for example a one line memory such as NEC Electronics' part number UPD41101, the previous complement of 74 LS 284 four bit adders, and AM29843 latches by Advanced Micro Devices.

Processor 110 computes a set of gain coefficients which raise the average value of each line and column close to that of the peak line or column. This set of coefficients is transferred to the horizontal correction memory 30 and vertical correction memory 40. Correction memories 30, and 40 can comprise, for example, an NEC 41101C-3 memory. These coefficients (gain values) stored within these memories are then used on subsequent images to correct the value of the (digital) amplitude output for white level distortions.

Given the above circuit structure, processor 110 uses software to perform these steps:
 a) divide each of the sums stored in its memory by the pre-programmed (known) number of pixels making up the lines forming line averages and subsequently compute vertical averages for all lines and columns making up the video image of the calibration target;
 b) search its memory for the horizontal and vertical averages having the largest values, called the peak values;
 c) using the average values having the peak values, processor 110 then calculates gain coefficients for each of the lines and columns;
 d) these gain coefficients are then stored in its internal memory for subsequent readout into the correction memories 30 and 40.

The two part equivalent mathematical procedure for this sequence of digital operations is as follows. Assume a digitized video image is represented by a matrix of pixel amplitudes Amp(n,m) containing n rows, each having m pixel amplitudes. Each n th horizontal row in the matrix traverses m columns and each m th vertical column traverses n lines. This corresponds to this equivalent representation of a video image in matrix form shown in FIG. 3. It is clear that the rows of Amp(n,m) represent the video lines in a video frame (or image). The vertical columns of Amp(n,m) are therefore formed from the pixels making up each row.

Figure 3:
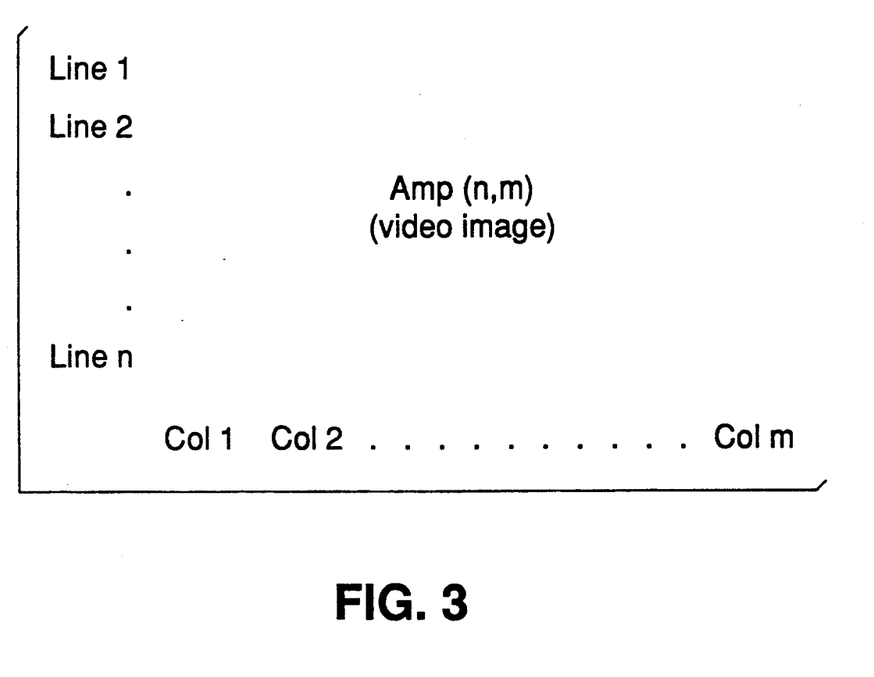
FIG. 3 shows a video image organized as a matrix used for mathematical modeling in this invention.

Given this mathematical model of a generalized video image, the description of the computation of the correction coefficients can be detailed.

I—Computing horizontal correction coefficients—(stored in vertical correction memory)

Step 1—computing averages for each line.

$$AVL(n) = \frac{\sum_{m=1}^{m} Amp(n,m)}{m}$$

Where
- Amp(n,m) is the equivalent matrix of digitized amplitudes of each pixel making up a video image, having n lines and m columns,
- n is the index of n horizontal lines of the image,
- m is the index of m columns formed by m pixels making up each line of the video image,
- AVL(n) is the line average of the nth line Step 2—finding the largest Average line.

$$PKL = MAX(AVL(n))$$

Where PKL is the largest (maximum) value in the set AVL(n) computed in Step 1.

Step 3—computing the line gain setting GAINL(n) needed to multiply each line n by to insure it will be raised to the same level as the largest average line PKL above $$GAINL(n) = \frac{PKL}{AVL(n)} - 1.0$$

The calculated gain coefficients GAINL(n) are then transferred to vertical correction memory 40 containing vertical shading correction by processor 110. Vertical correction memory 40 can comprise, for example, an NEC 41101-3 memory chip. The gain coefficients GAINL(n) calculated based on the horizontal line data are used to correct for the vertical shading; for this reason, they are loaded into the vertical correction memory 40.

Once the computed GAINL(n) is transferred to vertical correction memory 40, the image of the calibration target corresponding to a horizontally corrected Amp(n,m) will be available for the vertical correction step described below.

Under either assumption, regardless of the change in Amp(n,m) due to partial correction, the same general process is then carried out for the horizontal shading correction. Therefore, the vertical correction gains will be shown assuming that Amp(n,m) is the same, i.e. the vertical and horizontal correction computations are carried out.

II—Computing vertical correction gains—(stored in horizontal correction memory)

Step 1—computing averages for each column m.

$$AVC(m) = \frac{\sum_{n=1}^{n} Amp(n,m)}{n}$$

Where
- Amp(n,m) is the matrix of digitized amplitudes of each pixel, having n lines and m columns,
- n is the number of lines and
- AVC(m) is the column average of the mth column Step 2—finding the largest Average column.

$$PKC = MAX(AVC(m))$$

Where PKC is the largest (maximum) value in the set AVC(m) computed in Step 1.

Step 3 computing the gain setting GAINC(m) to multiply each column m by:

$$GAINC(m) = \frac{PKC}{AVC(m)} - 1.0$$

Note that the same computational routine is generally used for the computation of both the horizontal and vertical gains.

Summarizing, the gain coefficients needed to correct for white shading errors in video images are calculated by:

1) examining digital values of pixel amplitudes stored in both Horizontal Accumulator 90 and Vertical Accumulator 100;
2) computing the average value (AV) for each line (in Horizontal Accumulator 90) and column (in Vertical Accumulator 100);
3) determining the largest average value (PKL or PKC) for either a line and column contained in the two accumulators 90,100;
4) dividing the largest average value, peak value (PKL or PKC) by the average value AVE of each particular line n, or column m and then subtracting 1.0; and
5) writing the gain values in the correction memories 30,40.

Correction circuit 10 performs the actual signal correction which accomplishes the white shading correction in subsequent video images. As noted above, horizontal correction memory 30 and vertical correction memory 40 are loaded with gain coefficients GAINL(n) and GAINC(m) which, when summed together, added to 1, and applied to the video information from the A/D converter, will increase the average value of each of the vertical columns and horizontal lines to nearly that of their respective peak column or line.

The readout of the gains contained within the horizontal and vertical memories are clocked by the pixel clock and a horizontal clock, respectively, controlled by processor 110, and thereby output the appropriate gain coefficient in the horizontal and vertical direction via adders 50 and 60 at the timing corresponding to the image location of a particular pixel to be corrected. The two sets of correction values output from horizontal correction memory 30 and vertical correction memory 40 are added by adders 50 to provide a gain coefficient for each pixel making up the image. A coefficient of zero is produced where no correction is needed, i.e. at the peak value. A value of 1.0 is added to the summed correction signal by adder (60). This is the "unity gain point" of multiplier 70. Multiplier 70 can comprise, for example, an LMU12 multiplier manufactured by LOGIC.

In multiplier 70, the digitized input video signal is multiplied by the (digital) output from adder 60. For each pixel, a gain coefficient, of a value which will increase the gain of the incoming signal approximately to that of the peak average value, is multiplied by the incoming video signal. By using these coefficients, the output from multiplier 70 will be corrected to compensate for errors associated with white shading.

Generally multiplier 70 will be set to a number higher than 1.0 by virtue of adder 60 insuring that the lowest possible setting for 70 is 1.0. Therefore, in a typical scene viewed by the video camera, it is possible that one or more pixels are brighter than the peak value detected in the digital output generated when viewing the flat calibration target and performing the calibration function.

This implies that for those pixels whose equivalent digital "brightness" is relatively high, the output of the multiplier 70 may exceed the maximum count of D/A converter 400 needed to convert the digital video information into the analog waveform to be reproduced by monitor 300. Because D/A converter 400 is unable to correctly convert a digital input higher than a maximum count (255 in a 8 bit system, or 4095 in a 12 bit system or 65535 in a 16 bit system), limiter 80 is expressly provided to insure that the digital output does not exceed this maximum count. Limiter 80 will output a maximum count (255, 4095 or 65535) when the equivalent digital value of a bright pixel output from 70 equals or exceeds the maximum count of a particular system.

The following simplified example illustrates the operation of the present invention. For the purpose of this example, assume a video camera having a 5×5 matrix of photo detectors. This video camera is now used to acquire a television image (frame) having five horizontal lines each made up of 5 pixels. This means that the five vertical columns, will also be made up of five pixels. Table 1 below illustrates the values representing digital pixel amplitudes output from the camera when view a flat white calibration target before correction. The output of the 5×5 array of photo detectors is digitized through an eight-bit A/D converter.

TABLE 1

Digitized Video Amplitudes from video camera before correction

| | Col 1 | Col 2 | Col 3 | Col 4 | Col 5 | HOR AVG |
|---|---|---|---|---|---|---|
| Line 1 | 205 | 220 | 225 | 220 | 205 | 215 |
| Line 2 | 220 | 240 | 245 | 240 | 220 | 233 |
| Line 3 | 225 | 245 | 250 | 245 | 225 | 238 |
| Line 4 | 220 | 240 | 245 | 240 | 220 | 233 |
| Line 5 | 205 | 220 | 225 | 220 | 205 | 215 |

Referring to FIG. 2, upon arrival of the first 25 pixel frame the output of adder 60 will be 1.0 i.e. unity gain setting for multiplier 70. This is so because the output and contents of horizontal correction memory 30 and vertical correction memory 40 will both be 0. Since there is no correction at this point in time, the output of limiter 80 will be equal to the input to multiplier 70 i.e. no correction has yet been performed on the initial 25 pixel frame.

Next, the horizontal accumulator 90 adds all the values of Line 1 (205+220+225+220+205=1075) and outputs this accumulated value to processor 110. A horizontal enable signal provided by processor 110 clocks horizontal accumulator 90 to correctly time the accumulation process. Horizontal accumulator 90 does the same for each of the remaining Lines 2-5 and outputs their respective accumulated values (1165, 1190, 1165, 1075) to processor 110 as well. Processor 110, divides the accumulated value for each line by the total number of pixels in the line (e.g., for line 1, 1075:5=215) to arrive at an average value for each line. The dividing means of processor 110 then performs the same computation for each of the remaining lines 2-5 to obtain the average value for each of the lines. Using the sample pixel amplitudes shown in Table 1, the average values for lines 1-5 are 215, 233, 238, 233, and 215, respectively.

After arriving at the average values AVL(n), for each of the lines, processor 110, determines which of the line average values is the peak average value, PKL. The peak average among lines 1-5 is the average AVL(3) of line 3, or 238. To arrive at the coefficient for correction of the gain, processor 110 divides the peak value by the average value of each line and then subtracts 1.0 to obtain the correction coefficient for each pixel in the line. For example, for line 1, the peak value 238 is divided by the average value 215 and then 1.0 is subtracted to arrive at the coefficient 0.107. Similarly, the coefficients for the remaining Lines 2-5 are 0.022, 0, 0.022, 0.107, respectively. Digital values corresponding to these correction coefficients to be loaded into vertical correction memory 40, are added with the output of horizontal correction memory 30 (at this point in the calculation, the output from horizontal correction memory is still 0).

At adder 60, the unity gain figure of 1.0 is added to the output of adder 50 and is used to amplify the incoming video signal with multiplier 70 by the gains stored in vertical correction memory 40. The output values after this first horizontal correction step are shown below in Table 2.

TABLE 2

Corrected video output after horizontal correction

| | Col 1 | Col 2 | Col 3 | Col 4 | Col 5 |
|---|---|---|---|---|---|
| Line 1 | 227 | 244 | 249 | 244 | 227 |
| Line 2 | 225 | 245 | 250 | 245 | 225 |
| Line 3 | 225 | 245 | 250 | 245 | 225 |
| Line 4 | 225 | 245 | 250 | 245 | 225 |
| Line 5 | 227 | 244 | 249 | 244 | 227 |
| V AVG AVC(m) | 226 | 245 | 250 | 246 | 226 |

The values illustrated in Table 2 are the values output of the video correction process after the vertical correction step has been completed.

Next, the horizontal correction step is performed. The output from limiter 80, representing the vertically corrected video signal, is input to vertical accumulator 100. The vertical accumulator adds each of the values for each pixel of the vertical columns. The added values for columns 1-5 are 1129, 1223, 1250, 1223, 1229, respectively.

Processor 110 next divides the total of each column by the number of lines in the picture (e.g. for Column 1, 1129:5=226).

The dividing means of processor 110 does the same for each of the remaining Columns 2-4, arriving at the values of 245, 250, 246, 226, respectively for each of the remaining 4 columns. Processor 110 then determines the peak value (Column 3, 250) and divides the peak value by the average value of each column and subtracts 1.0 (e.g. Column 1, (250:226)−1.0=0.106). A digital value corresponding to this horizontal correction coefficient is input to horizontal correction memory 30. The same mathematical procedure is followed for the horizontal correction coefficients for Columns 2-5. The horizontal correction coefficient for Columns 1-5 in this example are: 0.106, 0.020, 0.0, 0.020, and 0.106, respectively.

The correction coefficients previously loaded into vertical correction memory 40 and the correction coefficient loaded into horizontal correction memory 30 are added at adder 50 for each individual pixel. At adder 60, the unity gain figure of 1.0 is added to the output of adder 50, and the result is then used to modulate the incoming digitized video signal at multiplier 70. Table 3 below lists the multiplier output values for each pixel which correct the magnitude of the incoming video signal after both horizontal and vertical gains stored in correction memories 40 or 50 have been added, incremented by 1, and applied by multiplier 70.

TABLE 3

| | Sum of correction GAINs for each pixel | | | | |
|---|---|---|---|---|---|
| | Col 1 | Col 2 | Col 3 | Col 4 | Col 5 |
| Line 1 | 1.213 | 1.127 | 1.112 | 1.127 | 1.213 |
| Line 2 | 1.128 | 1.042 | 1.026 | 1.042 | 1.128 |
| Line 3 | 1.106 | 1.020 | 1.000 | 1.020 | 1.106 |
| Line 4 | 1.128 | 1.042 | 1.026 | 1.042 | 1.128 |
| Line 5 | 1.213 | 1.127 | 1.112 | 1.127 | 1.213 |

The output of multiplier 70 for each pixel after the horizontal (second) correction step is performed on data shown in Table 1 are shown below in Table 4:

TABLE 4

| | Corrected pixel amplitudes | | | | |
|---|---|---|---|---|---|
| | Col 1 | Col 2 | Col 3 | Col 4 | Col 5 |
| Line 1 | 249 | 248 | 249 | 248 | 249 |
| Line 2 | 248 | 250 | 250 | 250 | 248 |
| Line 3 | 249 | 249 | 250 | 249 | 249 |
| Line 4 | 248 | 250 | 250 | 250 | 248 |
| Line 5 | 249 | 248 | 249 | 248 | 249 |

As can be seen from the figures in Table 4, the resulting signals are all brought up to approximately the value of the peak white value input to the system (250 in this example). Thus, a substantially flat white signal will be output for a flat white input signal. When extending this example to a standard NTSC television image, the correction process, takes about 1.5 seconds.

The system can be further enhanced by storing several correction waveforms in the memory of processor 110 for use with various zoom positions, iris settings, or any other conditions which would vary the amount of white shading correction needed. For example, when a different zoom position is used, the shading errors are different because, among other things, a different lens configuration is being utilized. To enable compensation for such differences, a plurality of memory locations in processor 110 could be used to store correction data corresponding to the different conditions. When, for example, the camera is set to a particular zoom position, the coefficient of correction is extended from a memory location corresponding to that zoom position. By switching the output of processor 110 based on which condition (zoom, iris setting, gain etc.) is present, the coefficient for correction for that particular condition would be quickly available.

Another feature of the present invention is that the inspecting and calculating steps specified can be repeated numerous times while the same image of the calibration target is being viewed before final correction coefficients are written in the vertical and horizontal correction memories. This sequential acquisition of the same video information as well as the ability of the method to converge towards a more refined answer after many iterations allows this system to be noise tolerant. The benefit is that the influence of signal noise during the performance of the described inspecting and calculating steps can be minimized by performing the inspecting and calculating steps many times over.

Although the present invention has been shown and described with respect to preferred embodiments, various changes and modifications which are obvious to persons skilled in the art to which the invention pertains are deemed to lie within the spirit and scope of the invention. For example, the system may be simplified by using fewer points during the averaging process, i.e. sampling fewer lines or columns, then either interpolating to obtain the missing samples for correction or, clocking the correction memories at a lower rate, effectively repeating the gain values for more than one pixel or one line. In addition, while the invention as disclosed above computes gain coefficients for each of the lines and columns which will increase the respective average values to that of the peak line or column the gain could also be decreased by calculating coefficients that would decrease the gain of the peak line and/or column. Thus numerous changes and modifications can be made while staying within the scope of the invention which is set forth in the appended claims.

What is claimed is:

1. A white shading correction apparatus for detecting and compensating for white shading errors in a digitized video signal representing a sequence of horizontally scanned video images of a flat white calibration target including a plurality of horizontal lines, each horizontal line comprising a plurality of pixels, comprising:

inspection means for inspecting said plurality of pixels;

calculating means for calculating a white level correction coefficient for each pixel inspected by said inspecting means, said calculating means including a first accumulator means for summing pixel amplitudes in each said horizontal line of said horizontally scanned video image, having a first output, said first output being the summed value of said pixel amplitudes for each said horizontal line, a second accumulator means for inspecting a plurality of horizontal lines and compiling from said horizontal lines a plurality of vertical column data derived from said plurality of pixels comprised within said horizontal lines, having a second output, said second output being the summed value of said compiled vertical column data for each column found in said plurality of pixels comprised within said horizontal lines, and processing means for computing said correction coefficients from said summed values output from said first output and second output derived from said first and second accumulator means respectively; and correction mean for correcting video images subsequent to said video image representing a flat white calibration target, said correction based upon said white level correction coefficients calculated in said calculating means, thereby compensating said subsequent video images present in said digitized video signal for white shading errors.

2. A white shading correction apparatus as set forth in claim 1, wherein said correction means comprises:

memory means for storing said correction coefficients;

multiplier means for multiplying said digitized video signal by said correction coefficients and for outputting a corrected video signal wherein said white shading errors are minimized.

3. A white shading correction apparatus as set forth in claim 2, wherein said memory means for storing correction coefficients comprises:
   horizontal correction memory means for storing correction coefficients generated from said vertical column data by said second accumulator means having a first correction output, said first correction output comprising horizontal correction coefficients corresponding to each pixel of said video signal; and
   vertical correction memory means for storing correction coefficients generated from said horizontal lines by said first accumulator means having a second correction output said second correction output comprising vertical correction coefficients corresponding to each pixel of said video signal; and
   combining means for combining said vertical correction coefficient and horizontal correction coefficient corresponding to a particular pixel of said video signal and outputting a pixel correction coefficient to said multiplier means synchronized to the time of arrival of said particular pixel.

4. A white shading correction apparatus for detecting and compensating for white shading errors in a digitized video signal generated by a video camera representing a sequence of horizontally scanned video images, each image having a plurality of pixels, comprising:
   inspecting means for inspecting each pixel in a digitized video signal representing a video image of a flat white calibration target;
   a first accumulator means for summing pixel amplitudes in each horizontal line of said horizontally scanned video image, having a first output, said first output being the summed value of said pixel amplitudes for each said horizontal line;
   a second accumulator means for inspecting a plurality of horizontal lines and compiling from said horizontal lines a plurality of vertical column data derived from said plurality of pixels comprised within said horizontal lines having a second output, said second output being the summed value of said compiled vertical column data for each column found in said plurality of pixels comprised within said horizontal lines;
   computer means for computing a plurality of correction coefficients for each of said pixels from said summed values output from said first and second accumulator means, and for storing said plurality of correction coefficients corresponding to a plurality of different video camera conditions including iris setting a zoom position; and
   correction means for applying said plurality of correction coefficients to each pixel of a sequence of video images comprised within said video signal based upon said correction coefficients, thereby correcting said video images for white shading errors.

5. A method for detecting an compensating for white shading errors in a digitized video signal representing a sequence of horizontally scanned video images each of said images having a plurality of horizontal lines, each horizontal line comprising multiple pixels, comprising the steps of:
   inspecting said plurality of pixels, said pixels being part of said video image while imaging a flat white calibration target;
   summing pixel amplitudes in each of said horizontal lines of said video image, thereby generating a first output, said first output being the summed value of said pixel amplitudes for each said horizontal line;
   inspecting a plurality of horizontal lines and compiling from said horizontal lines a plurality of vertical column data derived from said plurality of horizontal lines thereby generating a second output, said second output being the summed value of said compiled vertical column data for each column found in said plurality of horizontal lines;
   calculating white level correction coefficients for each pixel inspected in said inspecting step from said summed values output from said first output and second output; and
   correcting video images, subsequent to said video image representing said flat white calibration target, by applying said white level correction coefficients calculated in the previous step to said digitized video signal thereby compensating for white shading errors contained therein.

6. A method as set forth in claim 5 wherein the method for computing said correction coefficients calculated from said summed values comprises:
   computing the average amplitude for each said horizontal line in said image;
   finding the largest average for each said horizontal line in said image;
   computing a multiplier factor for each said horizontal line, that will bring the average of that line up to the largest line average in the image;
   computing the average amplitude for each said column data in the image;
   finding the largest average for each said column data in said image;
   computing a multiplier factor for each column that will bring the average of that column up to the largest column average in the image.

* * * * *